Aug. 7, 1928. 1,679,583
A. NINNIS
FOOD CUTTER AND SERVER
Filed April 14, 1926 2 Sheets-Sheet 1
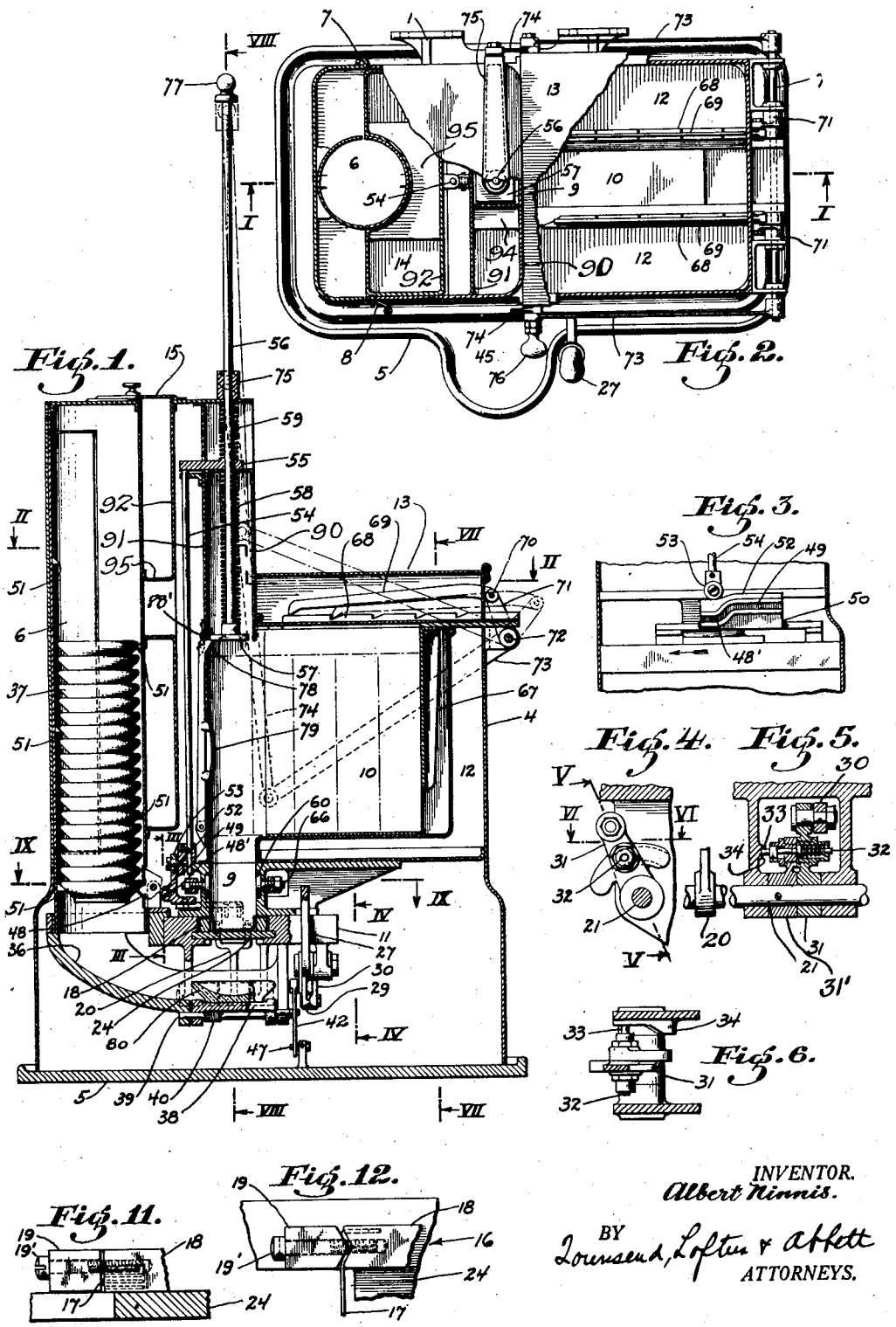
INVENTOR.
Albert Ninnis.
BY
Townsend, Loften & Abbett
ATTORNEYS.

Aug. 7, 1928.
A. NINNIS
1,679,583
FOOD CUTTER AND SERVER
Filed April 14, 1926   2 Sheets-Sheet 2
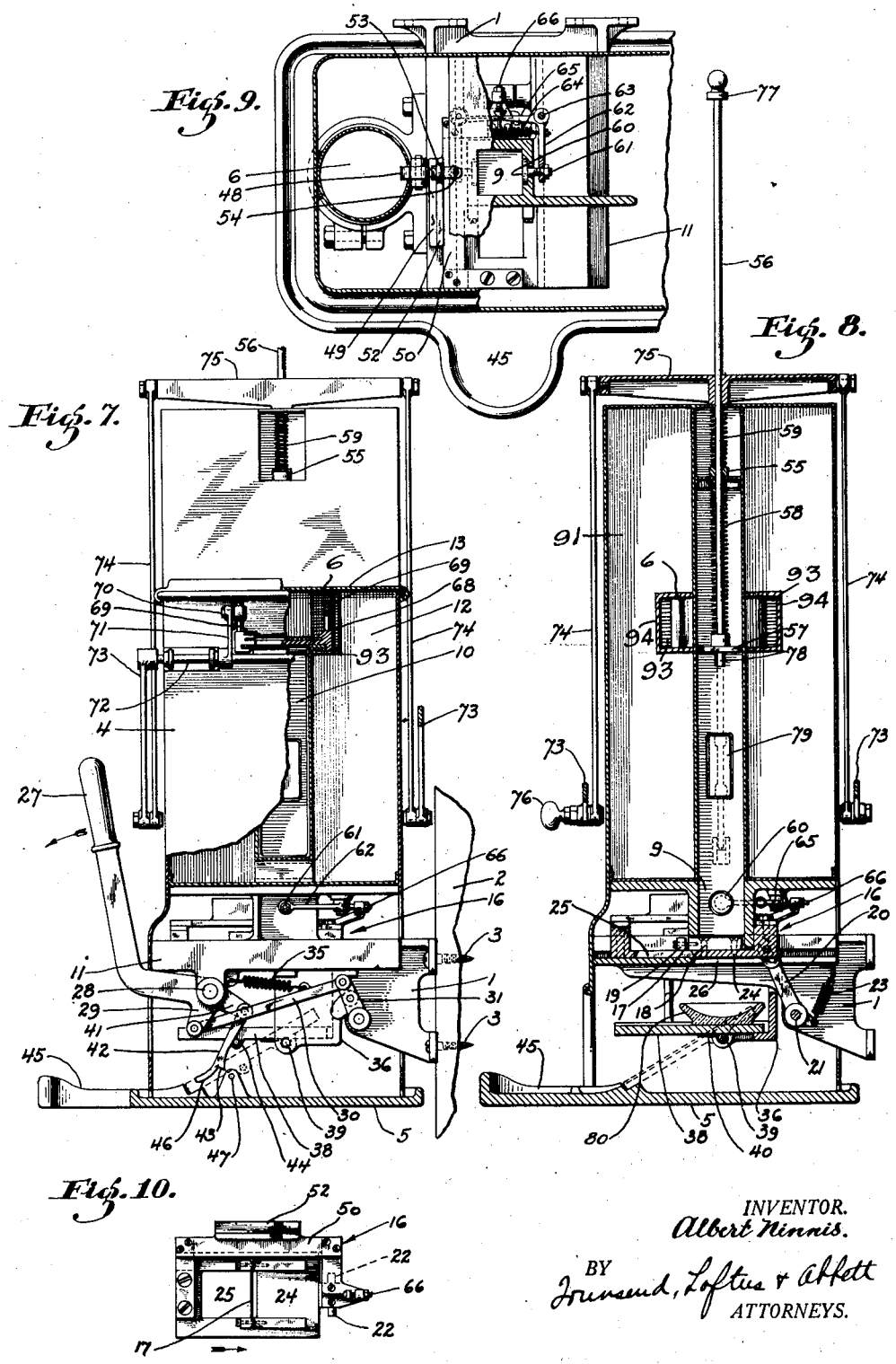
INVENTOR.
Albert Ninnis.
BY Townsend, Loftus & Abbett
ATTORNEYS.

Patented Aug. 7, 1928.

1,679,583

UNITED STATES PATENT OFFICE.

ALBERT NINNIS, OF RENO, NEVADA.

FOOD CUTTER AND SERVER.

Application filed April 14, 1926. Serial No. 101,909.

This invention relates to cutting and serving machines particularly for use in serving relatively soft sliceable food such as butter, ice cream etc. In the accompanying drawings, I have illustrated the invention as embodied in a butter serving machine. Heretofore, butter when it is to be used for individual service, has been cut into individual slices and dropped promiscuously into a container such as a bowl filled with ice water. These slices have been served by taking the same by hand from the bowl and serving them on individual trays as needed. Such system is not only inconvenient, but also very unsanitary. This is particularly true, since the butter slices are usually handled over considerably in breaking the slices apart for individual service upon the trays. My invention herein overcomes all these objections.

It is the primary object of my invention to provide an improved cutting and serving machine, wherein an individual slice of the food to be served will be cut from a column of such food and served directly onto an individual dish or tray without the hand coming into contact therewith at any time.

It is another object of my invention to provide such an improved cutting and serving machine having means cooperating therewith for automatically ejecting the trays as they are provided with a slice of the food thereon.

It is a further object of my invention to provide such an improved cutting and serving machine having a cooperating iced magazine for holding a surplus supply of the food to be sliced and means cooperating therewith for feeding the same into the slicing position as the same is needed.

Other and more specific objects of the invention will appear as this description proceeds.

In the accompanying drawings, I have illustrated one specific embodiment of my invention in a butter cutting and serving machine, but it will be understood that the invention can be otherwise embodied and that the drawings are not to be construed as defining or limiting the scope of the invention, the claims appended to this specification being relied upon for that purpose.

Referring to the figures of the drawings:

Figure 1 is a vertical sectional view through my improved machine taken on line I—I of Fig. 2.

Figure 2 is a plan view thereof broken away on line II—II of Fig. 1.

Figure 3 is a detail view taken on line III—III of Figure 1.

Figure 4 is a detail view taken on line IV—IV of Fig. 1.

Figure 5 is a detail view taken on line V—V of Fig. 4.

Fig. 6 is a detail view taken on line VI—VI of Fig. 4.

Figure 7 is a side elevation of the machine, partially broken away on line VII—VII of Fig. 1.

Figure 8 is a vertical sectional view taken on line VIII—VIII of Fig. 1.

Figure 9 is a plan sectional view taken on line IX—IX of Fig. 1.

Figure 10 is a detail plan view of the cutting slide.

Figure 11 is an enlarged fragmentary side view thereof.

Figure 12 is a plan view of Fig. 11.

In the drawings, 1 indicates the supporting frame of my machine which may be secured to a wall 2 by screws 3. An outer sheet metal wall 4 is carried by the frame and a bottom 5 is secured thereto. A tray magazine 6 having a door pivoted at 7 and a latch at 8 is provided on one side of the machine. A food magazine 9 is located adjacent thereto and is provided with a cooperating extension 10 for holding a surplus supply of the food to be sliced. The magazines 6 and 9 have their lower ends opening through the bottom 11 of the frame 1 as illustrated in Fig. 1.

A refrigerating chamber 12 adapted to receive ice is formed about the food magazine. Entrance to this chamber is had by a sliding cover 13. A similar icing chamber 14 is provided adjacent the tray magazine 6, entrance being had thereto by removing a cover 15.

A slide 16 is mounted in the bottom plate 11 directly beneath the lower end of the magazine 9. A fine cutting wire 17 is carried on the slide between two blocks 18 fixed thereon and two cooperating movable blocks 19. As illustrated in Fig. 11, the wire can be adjusted to cut slices varying in thickness. The blocks are secured together by screws 19'.

The slide 16 is operated by a yoke 20 fixed on a shaft 21 and connected to trunnions 22 on the slide. A spring 23 normally holds the yoke and slide in the position illustrated in Fig. 8. The column of food in the magazine 9 normally rests on the bottom plate 24 of the slide and when the slide is moved in the direction of the arrow (Fig. 10), the wire 17 cuts a slice from the bottom of the column and this slice falls through the opening 25 in the slide and a cooperating opening 26 in the bottom plate 11.

The yoke 20 is operated by a hand lever 27 pivoted at 28. An arm 29 on this lever is connected by a link 30 to an arm 31 loose on the shaft 21 directly adjacent an arm 31' fixed thereon. The arms are normally connected together by a spring-pressed plunger 32 in the arm 31 engaging in a hole in the arm 31'. A cooperating plunger 33 is carried by the arm 31' and rides against a cam 34. This cam is so arranged that it forces the plunger 32 out of the hole in the arm 31' at the end of the cutting movement of the slide. The spring 23 thereupon snaps the slide and yoke back to the starting position. A spring 35 moves the hand lever 27 and its connected parts back to the starting position in like manner.

A chute 36 is adapted to carry the trays 37 successively as they are released to a platform 38 pivoted at 39. A spring 40 normally holds this platform in the horizontal position. An arm 41 of the hand lever 27 has a link 42 pivoted thereto. A shoulder 43 on this link is adapted to engage a pin 44 on the platform and tilt the same downwardly to the position shown in dash lines in Fig. 7, whereupon the loaded tray or dish thereon slides outwardly onto a projecting portion 45 of the base 5. At the lower end of its movement, the curved end 46 of the link engages a pin 47 which releases the link from the pin 44. As soon as the dish rides off the platform, the latter tilts back to its horizontal position.

The trays 37 are successively released by a double toothed pivoted member 48 having an arm 48' engaging in a cam groove 49 on a plate 50 carried by the slide. Forward movement of the slide (see arrow Fig. 3), rocks the member 48 downwardly and releases the bottom dish. I have found that the entire weight of a column of dishes on the pivoted member 48, prevents such member from operating successfully. I therefore provide a plurality of alternately arranged supporting teeth 51 in the magazine 6 for aiding in supporting the weight of the dishes. By this arrangement, the weight of only a few of the lowermost dishes is carried by the pivoted member 48.

The upper edge 52 of the plate 50 provides a cam on which rides a roller 53 carried on the lower end of a rod 54. The upper end of this rod bears against a plate 55 through which extends a rod 56. A head 57 on the lower end of this rod normally rests on the column of food and, with the aid of a spring 58, keeps the column downward in contact with the plate 24. A spring 59 normally holds the plate 55 in a horizontal position wherein the rod 56 is free to slide therethrough. Forward cutting movement of the slide automatically lifts the rod 54 and cants the plate 55 sufficiently to slightly raise the head 57 and hold the same during the cutting operation and until the slide has returned to its starting position. It should be understood that while the lifting movement of the head 57 is very slight, it is sufficient to take the weight thereof off the food column.

The food column is also supported against downward movement during the cutting operation by the following means. A pair of presser feet 60 on studs 61 are carried on the ends of levers 62 pivoted to the base at 63. Spring means 64 normally draw the levers toward each other in a manner engaging the presser feet with the food column. The inner ends of the two inwardly extending arms 65 on the levers 62 are adapted to be engaged by a stud 66 carried on the rear end of the slide. When the slide is in its normal position (Fig. 9), the stud 66 holds the levers in the position illustrated and the presser feet away from the column. When the slide is moved inwardly, the springs 64 are permitted to move the levers together in a manner engaging the presser feet with and supporting the food column.

The following means is provided for automatically feeding the surplus food columns from the magazine extension 10 into the slicing magazine 9. A pusher 67 engages behind the surplus food columns and the upper end thereof is provided with a pair of toothed racks 68. These racks are engaged by a pair of pawls 69 pivoted at 70 to arms 71 on a shaft 72. A pair of arms 73 on the ends of this shaft have their free ends connected by links 74 to a cross head 75 loose on the rod 56. The cross head and its connected parts can be lifted by a knob 76 and such movement will engage a knob 77 on the rod 56 and lift the head 57. When thus lifted to a position above the food columns (Fig. 1), a pivoted latch 78 spring-pressed at 78' engages beneath the head and holds the same in its uppermost position. When moving the cross head downwardly, the pawls 69 move the pusher forwardly and feed a fresh food column into the magazine 9. This column engages against a projection 79 on the latch 78 and automatically releases the latch, whereby the head 57 drops down in place onto the column.

It should be noted that the rack bars 68 are sufficiently separated to clear the magazine so as to pass on opposite sides thereof when they are advanced by the pawls 69. There are a number of crosswise extending partition walls in the casing such as indicated at 90, 91 and 92 and as these are located directly in the path of the rack bars 68, openings 93 are formed in the walls through which the rack bars may pass. The walls 90 and 91 are connected by housings 94 (see Fig. 2), while the wall 92 and the magazine 6 are connected by a housing 95. These housings align with the openings 93 and as such form guideways for the rack bars and at the same time permitting a free forward movement of the rack bars and the pusher plate 67 when they are advanced by the pawls 69.

The operation of the machine illustrated is substantially as follows. The magazines 6, 9 and 10 are first filled as illustrated in the drawing, and preferably iced. The parts being in the position shown in Fig. 1, but with the head 57 below the latch 78, the operator draws the handle 27 downwardly in the direction of the arrow, Fig. 7. The following operations take place successively as the slide 16 moves. (1) Stud 66 leaves the lever arms 65 and the spring 64 pulls the presser feet 60 into contact with the food column to support the same during the cutting operation. (2) Cam 52 forces the rod 54 upwardly, which cants plate 55 and slightly raises and holds the head 57 from pressing on the food column. (3) Cam 49 rocks member 48 and releases the bottom tray 80, which thereupon slides down the chute 36 onto the pivoted platform 38.

Upon continued movement of the slide, the wire 17 cuts a slice from the bottom of the column and this slice falls through the holes 25 and 26 onto the tray 80. At the end of the slide movement the cam 34 and pin 33 force the plunger 32 backwardly and release the arm 31' and yoke 20 from the arm 31. Spring 23 thereupon snaps the yoke 20 and slide 16 back to the starting position. If the slice has not already dropped clear of the slide, this snapping movement aids in dislodging the slice. As the spring 35 moves the handle 27 back to its starting position, the shoulder 43 engages the pin 44 and tips the platform 38 downwardly, whereupon the loaded tray slides to the outer portion 45 of the base. The shoulder 43 is released from the pin 44 by the curved end 46 coming into contact with a pin 47. As soon as the dish slides off the platform 38, the platform pivots back to its horizontal position. The cutting wire 17 can be adjusted and released merely by loosening the screws 19'.

When the food column in the magazine 9 has been sliced sufficiently to bring the top of the column below the bottom of the extension 10, the operator lifts the knob 76 upward. This action lifts the rod 56 and head 57 and moves the pawls 69 backward. The head is held in its up position by the latch 78. Downward movement of the knob moves the pawls 69 and pusher 67 inwardly and forces the front food column into the magazine 9. As the column comes into the proper position, it engages the projection 79 and trips the latch 78, whereupon the head 57 drops downwardly onto the column. The surplus columns have therefore been moved forwardly and the head 57 raised and replaced automatically.

Having thus described my invention, what I claim is:

1. In a machine of the character described, the combination with a magazine for holding a column of sliceable food, of a movable member at the lower end of the magazine, a cutting wire on said movable member for cutting a slice from the column, an extension on the magazine and in communication therewith for holding a plurality of surplus columns, and means for transferring the surplus columns, one by one into the magazine as required.

2. In a machine of the character described, the combination with a magazine for holding a column of sliceable food, of a movable member at the lower end of the magazine, a cutting wire on said movable member for cutting a slice from the column, an extension on the magazine and in communication therewith for holding a plurality of surplus columns, means actuated by movement of the movable member for intermittently gripping and releasing the column in the magazine, other means for automatically advancing the column after each slicing operation, manually actuated means for retracting said advancing means, and means actuated by the retraction of said means for advancing a surplus column into the magazine.

3. In a machine of the character described, the combination with a magazine for holding a column of sliceable food and having an extension formed thereon to receive a plurality of surplus columns, of means at the bottom of the magazine for cutting slices from the column, a spring-actuated plunger adapted to advance the column after each slicing operation, means whereby said spring-actuated plunger is manually returned after the slicing operation of a column, and means actuated by said return movement of the plunger for automatically advancing one of the surplus columns to the magazine.

4. In a machine of the character described, the combination with a magazine for holding a column of sliceable food and having an extension formed thereon to receive a plurality of surplus columns, of means at the bottom of the magazine for cutting slices from the column, a spring-actuated plunger adapted to advance the column after each slicing operation, a rod and a cross-head on the plunger whereby the plunger may be manually raised to an elevated position in the magazine, a crank-arm disposed on one side of the magazine, a link forming a connection between the crank and one end of the cross-head, a slide plate, a projection on the slide plate engageable with the surplus columns, a ratchet bar on the slide plate, and a pawl connected with the crank arm and engageable with the ratchet bar to advance the surplus columns, a sufficient distance to transfer the foremost surplus column to the magazine.

5. In a machine of the character described, the combination with a magazine for holding a column of sliceable food and having an extension formed thereon to receive a plurality of surplus columns, of means at the bottom of the magazine for cutting slices from the column, a spring-actuated plunger adapted to advance the column after each slicing operation, a rod and a cross-head on the plunger whereby the plunger may be manually raised to an elevated position in the magazine, a crank-arm disposed on one side of the magazine, a link forming a connection between one end of the crank and the cross-head, a slide plate, a projection on the slide plate engageable with the surplus columns, a ratchet bar on the slide plate, a pawl connected with the crank-arm and engageable with the ratchet bar to advance the surplus columns, a sufficient distance to transfer the foremost surplus column to the magazine, a latch engageable with the plunger for retaining it when elevated, and means actuated by advance of a surplus column to the magazine to release the latch so the plunger may exert its pressure on the column.

6. In a cutting and serving machine having a magazine for holding a column of relatively soft sliceable food, a slide having a cutting wire at the lower end of the magazine for cutting a slice from the column and a weight for moving the column downwardly, the combination of a rod extending upwardly from the weight, a plate cooperating with the rod, and means for canting the plate in a manner binding the same against the rod and releasing the force of the weight on the column.

7. In a machine of the character described the combination with a magazine adapted to receive a column of sliceable food, of a sliding plate below the magazine normally forming a bottom therefor to support the column of food, said plate having a discharge opening formed therein, a cutting wire carried by the plate forward of the discharge opening, means for imparting a reciprocal movement to the plate to cut a slice off of the column and to bring the discharge opening into alignment with the column, a pair of gripping members engageable with opposite sides of the food column, and means actuated by the reciprocal movement of the plate whereby the gripping members are moved into engagement to support the column during the slicing operation and to release the column during the return movement of the plate.

8. In a machine of the character described the combination with a magazine adapted to receive a column of sliceable food, of a sliding plate below the magazine normally forming a bottom therefor to support the column of food, said plate having a discharge opening formed therein, a cutting wire carried by the plate forward of the discharge opening, means for imparting a reciprocal movement to the plate to cut a slice off of the column and to bring the discharge opening into alignment with the column, a pair of bell-cranks pivotally mounted one on each side of the magazine, a gripping member on one end of each bell-crank adapted to be moved into and out of engagement with the food column during movement of the bell-cranks about their pivots, a spring connecting the bell-cranks and normally holding the gripping members in engagement with the food column, and a lug on the sliding plate engageable with the opposite ends of the bell-cranks to swing the same about their pivots to release the gripping members.

9. A cutting and serving machine comprising the combination of a magazine for holding a column of relatively soft sliceable food, a movable member having a cutting wire at the lower end of the magazine for cutting a slice from the column, means providing an extension laterally of the magazine for holding a plurality of surplus columns, means providing a cooling chamber around the magazine and extension, and means for moving the surplus columns to place the forward one thereof in the magazine.

10. A cutting and serving machine comprising the combination of a magazine for holding a column of relatively soft sliceable food, a movable member having a cutting wire at the lower end of the magazine for cutting a slice from the column, a weight adapted to rest on the upper end of the column to feed the same downward, a latch for holding the weight in its upper inoperative position, means providing an extension laterally of the magazine for holding a plurality of surplus columns, means for moving the surplus columns to place the forward one thereof in the magazine, and means automatically releasing the latch when the said one column is properly positioned in the magazine.

11. A cutting and serving machine comprising the combination of a magazine for holding a column of relatively soft sliceable food, a movable member having a cutting wire at the lower end of the magazine for cutting a slice from the column, a weight adapted to rest on the upper end of the column to feed the same downward, a latch for holding the weight in its upper inoperative position, means for lifting the weight to such position, means providing an extension laterally of the magazine for holding a plurality of surplus columns, and means operated by the movement of the said lifting means in the opposite direction to move the surplus columns to place the forward one thereof in the magazine.

12. A cutting and serving machine comprising the combination of a magazine for holding a column of relatively soft sliceable food, a movable member having a cutting wire at the lower end of the magazine for cutting a slice from the column, a weight adapted to rest on the upper end of the column to feed the same downward, a latch for holding the weight in its upper inoperative position, means for lifting the weight to such position, means providing an extension laterally of the magazine for holding a plurality of surplus columns, means operated by the movement of the lifting means to move the surplus columns to place the forward one thereof in the magazine, and means automatically releasing the latch when the said foremost column is properly positioned in the magazine.

ALBERT NINNIS.